S. SNELL.
Perforated Tile for Draining Paper Stock, and for Other Purposes.
No. 206,632. Patented July 30, 1878.
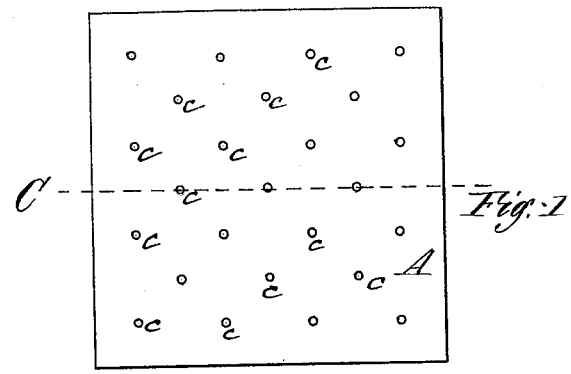
Fig. 1.
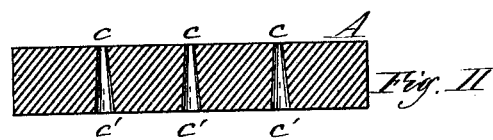
Fig. II.
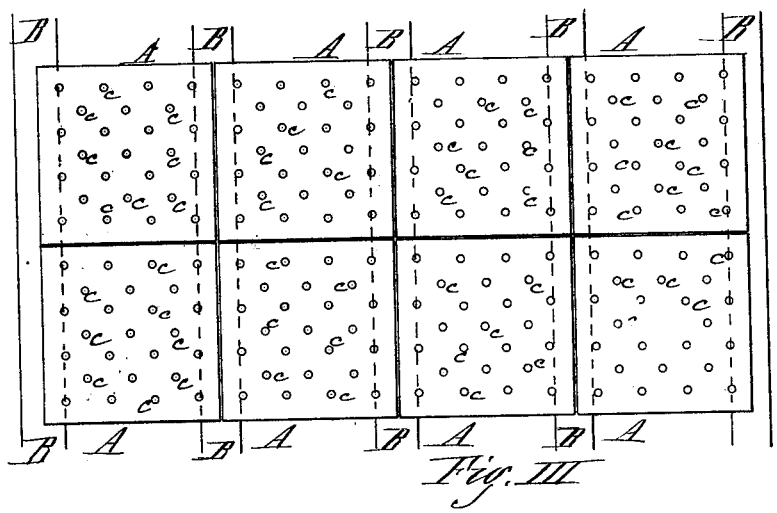
Fig. III.
Witnesses—
T. Aleutis.
E. A. Thayer.
Geo. D. Chamberlain
Inventor:
Samuel Snell

UNITED STATES PATENT OFFICE.

SAMUEL SNELL, OF SPRINGFIELD, MASSACHUSETTS.

IMPROVEMENT IN PERFORATED TILES FOR DRAINING PAPER-STOCK AND FOR OTHER PURPOSES.

Specification forming part of Letters Patent No. 206,632, dated July 30, 1878; application filed June 12, 1877.

*To all whom it may concern:*

Be it known that I, SAMUEL SNELL, of Springfield, Hampden county, State of Massachusetts, have invented certain Improvements in Strainers for use in the bottom of Drainers in Paper-Mills, of which the following is a specification:

The object of my invention is to provide a strainer which will be cheap and durable, which will not discolor the paper-stock, and which will be free from liability to become choked by the material; and to this end the invention consists of a flat tile provided with conical or flaring holes, and combining a series of such tile with tile or concrete supports, as hereinafter described.

In the manufacture of paper the stock, consisting of wet ground rags or similar material, is dumped from the engine into what are known as "drainers," the bottoms of which are perforated to permit the escape of the water. The perforated bottoms of these screens or drainers have hitherto been made in many different ways, all of which have been found subject to serious objection in practical use. In some instances difficulty was experienced from the liability of the holes or perforations to become clogged or closed by the wet material. In other cases difficulty arose from the fact that the strainers were made of metal, the oxidation of which caused a discoloration of the stock. These difficulties I overcome by making my strainer of tile and providing it with perforations of a flaring or conical form larger at the bottom than at the top, and in supporting the tile thus made by beams or bars, of tile or concrete, which, like the tile, are free from liability of oxidation.

Figure 1 represents a plan view of my improved strainer; Fig. 2, a cross-section of the same; Fig. 3, a top-plan view illustrating the manner of constructing the floor or bottom of the machine.

The tiles A are made of any suitable clay or composition, of a flat and regular form, and provided with numerous vertical openings or perforations $c$, the lower ends of which are larger than the upper.

In constructing the drainer it is provided at the bottom with a series of longitudinal bars or supports, B, made of tile or concrete, and arranged parallel with each other at suitable distances apart. Upon these beams I arrange the tiles A in such manner as to form a continuous unbroken floor to support the paper-stock. The perforations $c$ permit the water to flow from the stock, and, owing to their conical form, avoid the danger of the material which may enter their upper ends lodging within them.

I am aware that a drain-pipe for agricultural purposes has been made of tile and provided with perforations, and this I do not claim; but, Having described my invention, what I do claim is—

1. A strainer for use in machines for draining paper-stock, consisting of a flat tile, A, provided with a series of vertical conical openings, $c$, as shown and described.

2. As an improvement for draining paper-stock, a bottom composed of a series of concrete or tile supports, B, and a series of tile-slabs, A, arranged thereon and provided with tapering perforations $c$, as and for the purpose shown and described.

SAMUEL SNELL.

Witnesses:
 T. A. CURTIS,
 E. H. THAYER.